US005300170A

United States Patent [19]

Donohoe

[11] Patent Number: 5,300,170

[45] Date of Patent: Apr. 5, 1994

[54] DECAL TRANSFER PROCESS

[75] Inventor: John Donohoe, Big Flats, N.Y.

[73] Assignee: Corning Incorporated, Corning, N.Y.

[21] Appl. No.: 2,058

[22] Filed: Mar. 1, 1993

Related U.S. Application Data

[63] Continuation of Ser. No. 783,863, Oct. 28, 1991, abandoned.

[51] Int. Cl.[5] ........................ B32B 31/00; B30B 5/02; B44C 3/00

[52] U.S. Cl. .................................... 156/235; 156/344; 156/493; 156/542; 156/581; 156/583.3; 156/584; 100/93 P; 100/207; 100/211

[58] Field of Search ............... 156/235, 542, 581, 584, 156/249, 320, 493, 540, 541, 583.3, 230, 231, 240, 344; 100/93 P, 207, 211

[56] References Cited

U.S. PATENT DOCUMENTS

| | | | |
|---|---|---|---|
| 2,077,790 | 4/1937 | Hakogi | 101/35 |
| 4,352,712 | 10/1982 | Paul | 156/540 |
| 4,353,775 | 10/1982 | Paul | 156/540 |
| 4,392,905 | 7/1983 | Boyd et al. | 156/235 |
| 4,511,425 | 4/1985 | Boyd et al. | 156/493 |
| 4,532,175 | 7/1985 | Johnson et al. | 428/220 |
| 4,875,962 | 10/1989 | Breakspear | 156/245 |
| 4,980,221 | 12/1990 | Kobayashi et al. | 156/230 X |

FOREIGN PATENT DOCUMENTS

| | | |
|---|---|---|
| 2081645 | 2/1982 | United Kingdom . |
| 2193158 | 2/1988 | United Kingdom . |

*Primary Examiner*—David A. Simmons
*Assistant Examiner*—J. Sells
*Attorney, Agent, or Firm*—Milton M. Peterson; Clinton S. Janes, Jr.

[57] ABSTRACT

Apparatus and method for transfer and application of an offset, heat release decal to an article surface. A thin, supported, silicone membrane is indexed through successive work positions where the membrane is heated, picks up a heated decal and brings the decal into contact with the article surface for printing.

16 Claims, 3 Drawing Sheets

DECAL TRANSFER PROCESS

This is a continuation of application Ser. No. 07,783,863, filed Oct. 28, 1991, now abandoned.

FIELD OF THE INVENTION

The field is apparatus and method for transfer and application of offset heat release decals.

BACKGROUND OF THE INVENTION

Heat release decals customarily include a design layer supported on a substrate which is usually a paper sheet. An intermediate adhesive layer may be provided between the design layer and the paper sheet. That layer is solid at ambient temperature and softenable when heated. This permits separation of the design layer and the paper sheet, either during pickup of the decal or after its application to an article being decorated.

Heat release decals, as well as equipment for their application to ware, have been in use for many years. This is especially true for direct applied decals. There, the decal is brought into contact with the ware being decorated, and the design layer is applied by heat and contact pressure. Pressure may be applied by a rubber roller or pressure pad. Heat may be supplied by a heated pressure or print pad, for example, by an electrically heated pad. Alternatively, heat may be supplied by preheated ware.

Recently, an offset heat release decal process has been proposed where the decal is preheated on a platen. The design layer of the preheated decal is picked up from the decal paper substrate by a silicone print pad, The design layer is then transferred to the ware and applied by pressing the silicone print pad into contact with the ware. A feature of such a process is ability to design the print pad for use with curved or otherwise irregular surfaces.

Such a process holds forth much promise. However, certain problems limit its use. These involve primarily temperature control and material selection.

The design layer must separate from the carrier paper during pickup. This means that the temperature of the decal must be raised sufficiently to soften the adhesive layer. However, the adhesive must not become so hot that it becomes too fluid. It is evident that close temperature control must be exercised.

The transfer pad presents even more of a problem. The pad is normally of substantial size such that its temperature cannot be quickly changed. During decal pickup, the pad temperature must be sufficiently high so that the pad does not act as a heat sink and freeze the adhesive layer. However, some heat will be lost during transfer, and even more as the decal is applied to the ware. The ware, of course, will be at ambient temperature to freeze the adhesive on the surface of the ware, thereby permitting release of the decal from the pressure pad.

The net effect is that the transfer pad must be reheated between cycles. Because of its substantial size, this is relatively time consuming. This slows the rate at which the machine can be operated.

The material problem is one of selecting a suitable silicone material for the silicone transfer pad. On the one hand, the silicone must be relatively soft and deformable, that is, have a low durometer reading. This is necessary to avoid ware fracture when pressure is applied during decal application. However, most silicone materials of this nature do not have good release properties. In summary then, the problem is effecting a compromise between good chemical properties for decal release and good physical properties to avoid ware damage.

It is a basic purpose of my invention to provide a novel apparatus and process for offset heat release decal application that avoids the problems just discussed. Another purpose is to provide an apparatus and process where transfer of the decal is less dependent on the nature of the pressure pad.

SUMMARY OF THE INVENTION

The apparatus of my invention includes a plurality of work positions, a thin, silicone membrane carried by a support member, means for indexing the membrane and support member throuqh successive work positions, means for heating the membrane at a first work position, means for presenting a decal for pickup by the heated membrane at a second work position, means for bringing the membrane and decal into close proximity to an article at a third work position and means for applying pressure through the membrane to print the decal on the surface of the article.

In one embodiment, the silicone membrane may be 0.040 to 0.100" (0.10–0.25 cm) thick. It may be heated by a heated platen, or by focused infra-red heating means. A single print head may be employed to apply pressure through the silicone membrane for the decal pickup and also for printing the decal on the ware. However, it is preferred to provide a separate print head for each operation and to heat each head.

The invention further resides in a method of applying an offset, heat release decal to an article surface which includes the steps of supporting a thin, silicone membrane at the membrane periphery, indexing the supported membrane through successive work positions, heating the membrane to a predetermined temperature at a first position, presenting a decal for pickup by the membrane at a second position, heating the decal to a predetermined temperature, bringing the membrane into contact with the heated decal to pick the decal up on the membrane, bringing the decal on the membrane into contact with the article surface and releasing the decal from the membrane onto the article surface.

Attention is directed to the following patents as illustrating the state of the art:

U.S. Pat. No. 2,077,790 (Hakogi) describes an offset printing apparatus in which a blanket carries an ink pattern, the blanket is pressed into a bowl to be decorated and air is evacuated between the blanket and the bowl.

U.S Pat. No. 4,392,905 (Boyd et al.) describes a laminate carried by a paper support, and application of the laminate to an article by a heated, silicone rubber transfer pad. The laminate support is heated to a temperature of 390°–420° F. to soften an adhesive layer, and the transfer pad is heated to a lower temperature of 300°–350° F.

U.S. Pat. No. 4,532,175 (Johnson et al.) describes a silicone membrane for use in collecting and transferring an ink design. The membrane is preferably 0.030 to 0.090" (0.075 to 0.225 cms) thick and has other defined release characteristics.

British No. 2,081,645 (Clare) describes a transfer apparatus that employs a vacuum pickup, and that heats a decal with an electric heating element for release.

British No. 2,193,158 (Pass) describes an apparatus including a heated platen to soften the adhesive layer in a decal for removal of the backing, and a deformable, heated transfer pad.

BRIEF DESCRIPTION OF THE DRAWINGS

In the accompanying drawings.

Figure 1:
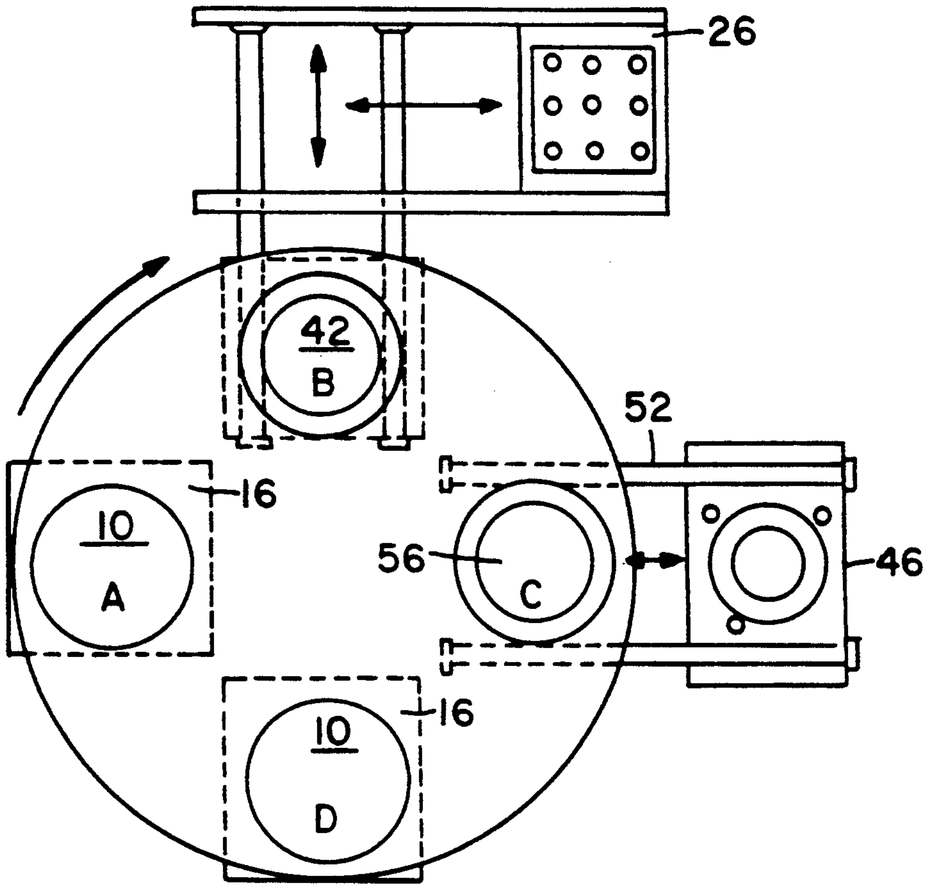
FIG. 1 is a schematic top view of a four-position, indexing table in accordance with the invention.
Figure 2A:
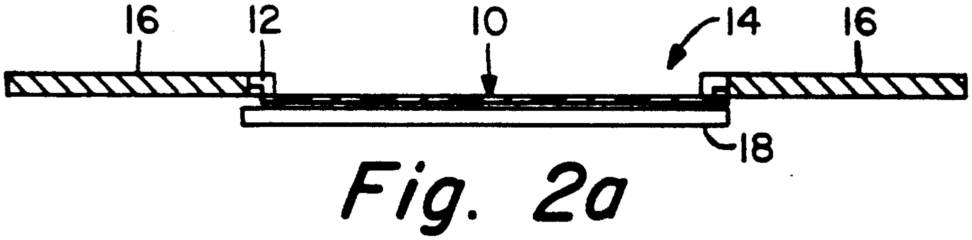
Figure 2B:
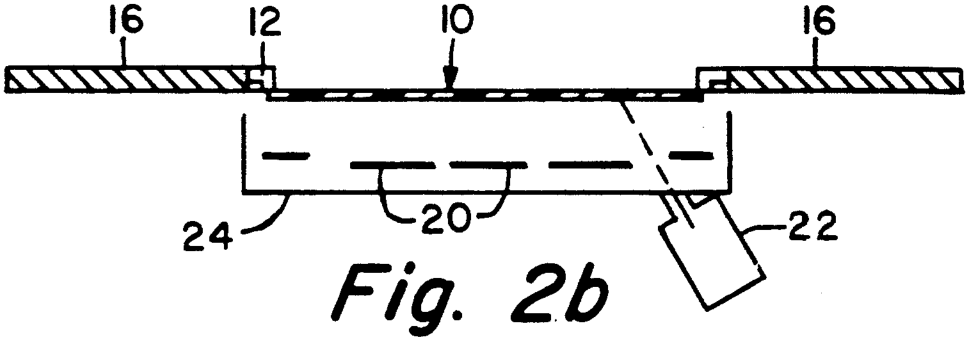

FIG. *2a* is a schematic view in cross-section taken at position A of FIG. 1.

FIG. *2b* is a schematic view in cross-section that is similar to FIG. *2a*, but illustrates an alternative heating system.

Figure 3:
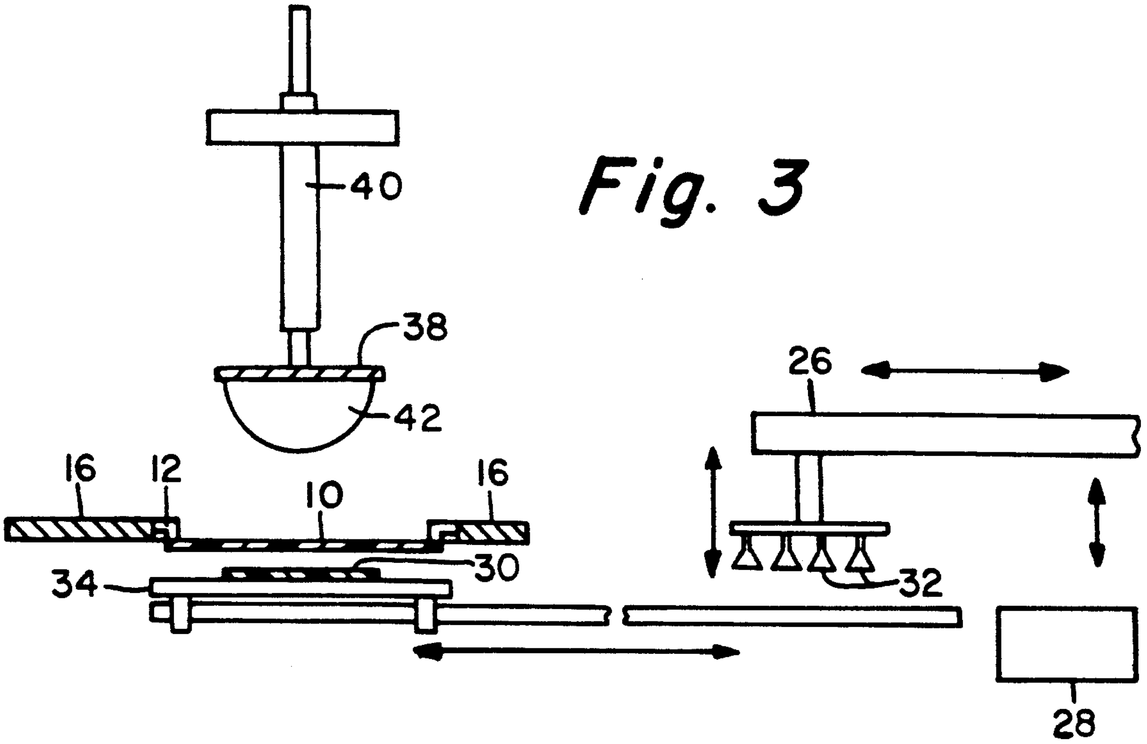

FIG. 3 is a schematic view in cross-section taken at position B of FIG. 1.

Figure 4:
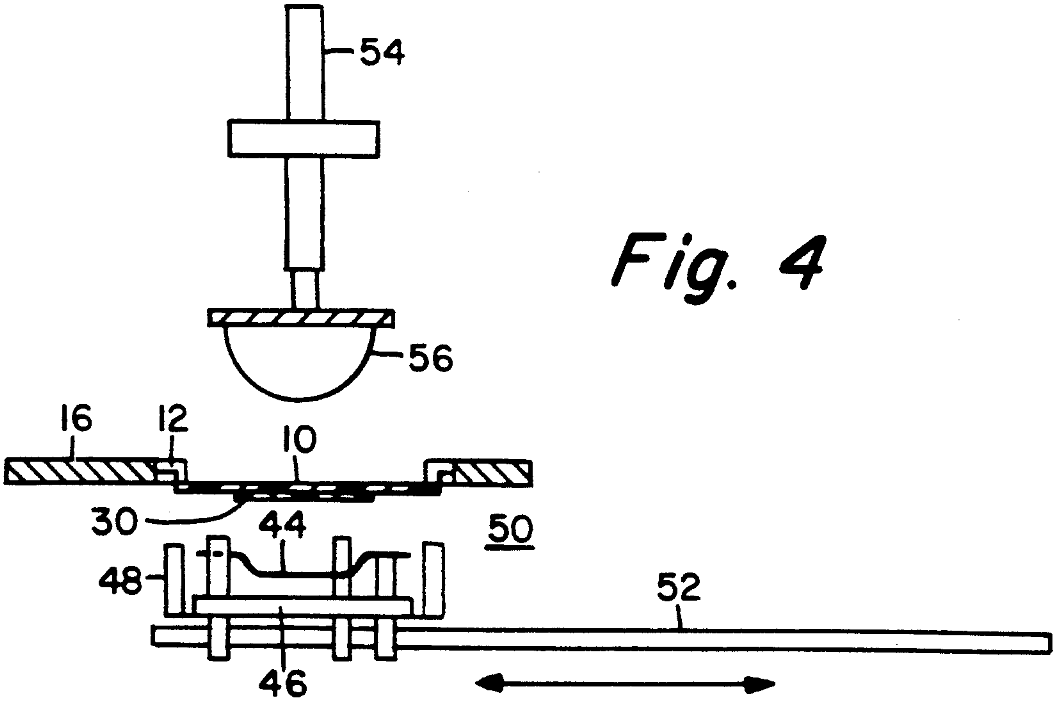

FIG. 4 is a schematic view in cross-section taken at position C of FIG. 1.

Figure 5:
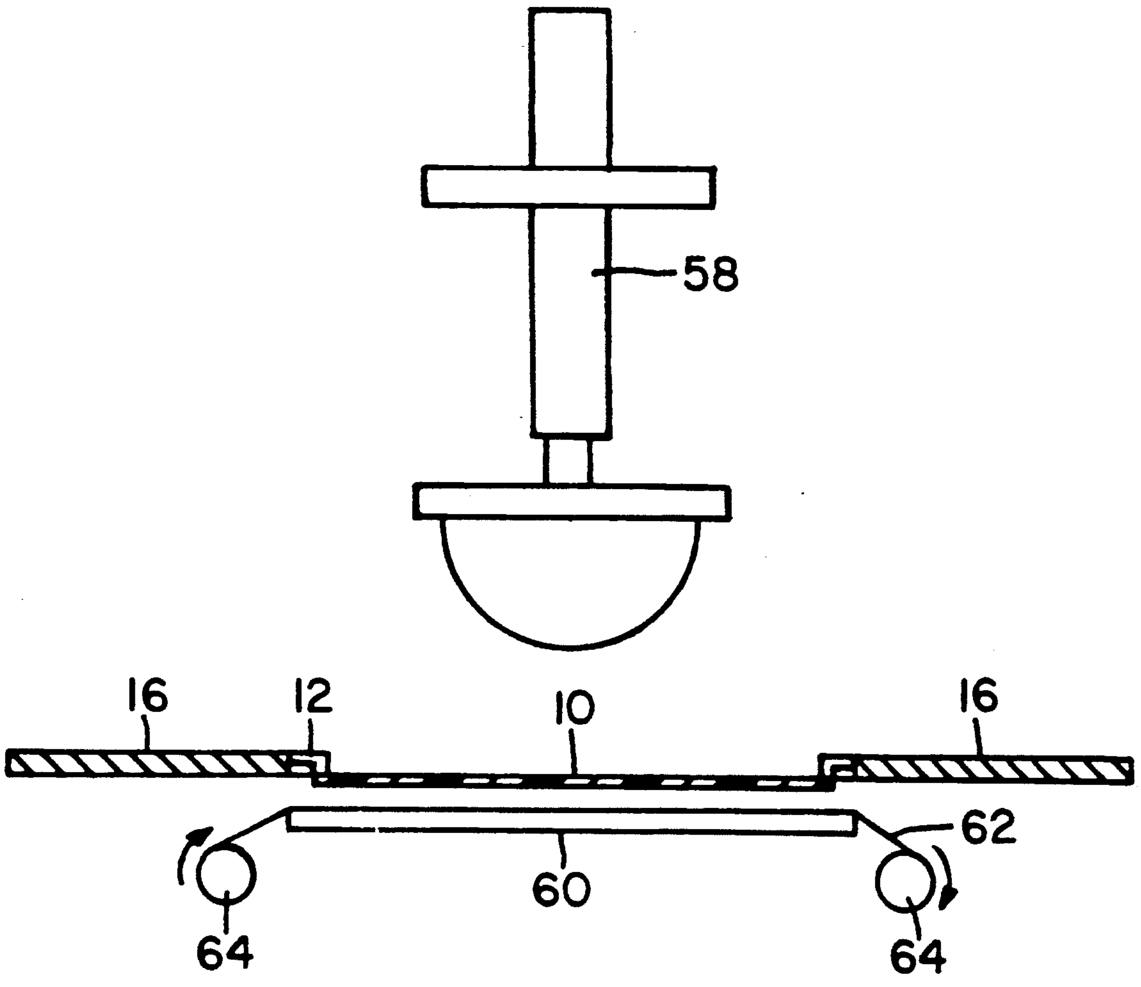

FIG. 5 is a schematic view in cross-section taken at position D of FIG. 1.

DESCRIPTION OF THE INVENTION

My invention resides in an apparatus for, and method of, applying an offset, heat release decal to an article. A key feature is the use of a thin, flexible, silicone membrane as a mechanism for picking up, transferring and printing a decal on an article. The silicone membrane is preferably in the range of 0.040 to 0.100" (0.10–0.25 cm) thick. Because of its thin nature, the durometer of the silicone is not critical, as it is in prior printing pads. Rather, the silicone for the membrane may be selected on the basis of optimum release characteristics.

A basic concept of the invention is physical separation of the thin, silicone membrane from a relatively bulky print or press pad. The print pad is still required in applying pressure through the membrane. However, the two members are physically separated so that critical temperature control is exercised in the membrane, not in the print pad. This will become more apparent as the invention is further described with reference to the accompanying drawings.

FIG. 1 is a schematic drawing showing a four-position, indexing membrane table. In this FIGURE, the membrane, in each of the four positions, is mounted with the print surface facing down. Position A is a membrane heater position. Position B is a decal pickup position. Position C is a decal print position where the decal is brought to, and printed on, the ware. Position D is optional, and is a position where additional membrane heating and/or cleaning may occur. The elements involved, and the functions carried out at positions A–D, are detailed in FIGS. 2–5, respectively.

FIGS. *2a* and *2b* are schematic views in cross-section. They illustrate alternative heating systems for membrane 10 in position A. Membrane 10 is a thin silicone member, usually circular in nature, which is mounted on member 12. Member 12 is shown as a metal ring that rests in an opening 14 in membrane table 16. Table 16 may have any suitable geometry, but is shown as a square, movable, flat sheet of any suitable material.

It is necessary to uniformly and rapidly heat the under surface of membrane 10 to a fixed, set-point temperature. The absolute value of that temperature will vary with, and depend on, the heat release decal construction and materials.

FIG. *2a* illustrates a simple system employing a temperature-controlled platen 18. Platen 18 may, for example, be electrically heated. It may be controlled at a temperature determined to be adequate for quick reheating of the membrane after each cycle. Heated platen 18 is mounted close to the under surface of membrane 10, but with sufficient clearance to permit indexing of membrane table 16.

FIG. *2b* shows an alternative heating system. Membrane 10 may be mounted as in FIG. *2a*. However, heated platen 18 is replaced by infra-red heaters 20. Heaters 20 will also be controlled to bring membrane 10 to a fixed temperature at position A. The surface temperature of membrane 10 may be monitored by an optical pyrometer 22. In order to conserve and focus the heat generated, heaters 20 may be surrounded by a shroud-like enclosure 24.

Referring back to FIG. 1, membrane table 16 is indexed from position A to position B preparatory to picking up a decal for printing. At position B, a decal loader system 26 includes a decal magazine 28 from which a decal 30 is picked up by suction cups 32 and carried forward to a heated vacuum platen 34. The decal is released to platen 34 where it is held in place by vacuum means (not shown). Platen 34, carrying decal 30, then slides into position under membrane table assembly 16 and presshead assembly 36. This is shown in a schematic cross-section view in FIG. 3.

Presshead assembly 36 is a conventional component that has a cross arm construction, as shown, for vertical opera&.ion. Assembly 36 has a sheet 38 carried by vertical post 40 that serves as a carrier for presshead 42. The latter is composed of a deformable silicone. When presshead 42 is lowered against membrane 10, the membrane is depressed against decal 30 to pickup the decal.

Decal 30, in turn, is heated by platen 34 to soften an adhesive layer between the design layer and the decal backing. This permits separation to occur readily. Platen 34 may correspond to platen 18 in FIG. *2a*. It operates at a set temperature. This temperature control, together with a controlled dwell time, ensures optimum conditions in decal 30 for its pickup by membrane 10.

As presshead 42 is lowered against membrane 10, the latter is deformed and pressed into contact with decal 30. The dwell time of presshead 42 is controlled, after which the presshead is retracted. This releases the pressure on membrane 10, thereby allowing it to regain its shape and lift the design layer of decal 30 away from its paper backing. Membrane table 16 then indexes to position C. Meanwhile, decal platen 34 retracts and the spent paper backing is removed preparatory to starting another cycle.

FIG. 4 is a schematic view in cross-section showing membrane table 16 indexed to position C with membrane 10 carrying decal 30. FIG. 4 also shows the arrangement for transfer of decal 30 to an article 44. In this arrangement, article 44, e.g., a dinner plate, is loaded in a vacuum chuck 46. Chuck 46 embodies a centering device 48 to hold article 44 in a fixed position. After article 44 is loaded in chuck 46, the assembly 50 is moved laterally on a track 52. This positions assembly 50 in alignment with a presshead assembly 54 and membrane 10.

Presshead assembly 54 is similar in structure and operation to assembly 36 of FIG. 3. The operative element is presshead 56 which, like presshead 42, is composed of a deformable silicone rubber. With article 44 in position, presshead assembly 54 is lowered to bring presshead 56 into contact with membrane 10. Further downward movement of assembly 54 deforms membrane 10 and presses decal 30 into contact with ware 44. A dwell timer operates to maintain contact pressure until the transfer of decal 30 is complete. Presshead assembly 54 then retracts to its inoperative position. At the same time, the ware assembly 50 moves back to its out position from unloading article 44 and loading of another article for another print cycle. Meanwhile membrane table 16 is indexed to position D.

As shown in FIG. 5, position D may be a combined preheat and cleaning station. A third presshead assembly 58, similar to previous assemblies 42 and 54, and a heated platen 60, similar to heated platens 18 and 34, are provided. Platen 60 serves to heat the membrane 10 for cleaning. It also reduces the heating time required in position A.

Presshead assembly 58 may be lowered to deform membrane 10. This presses membrane 10 against a cleaning material 62 which may be rolled over platen 60. A continuous roll of paper 62, passing between rolls 64, has been found successful to remove any decal residue from the membrane. After a fixed dwell time, presshead assembly 58 is retracted. Membrane table 16, with a clean and preheated membrane 10, is then indexed to position A to begin a new cycle.

An essential feature of my invention then is use of a thin silicone membrane as a pickup and print member. Necessarily, the membrane is used in conjunction with a means of applying pressure, such as the presshead assemblies shown. However, the membrane is a separate and distinct member that can be controlled independent of the presshead.

A primary significance of this distinction is that the characteristics of the presshead and the membrane may be optimized separately, that is, each for its inherent function. In choosing a membrane material, the primary concern will be release characteristics that are of a chemical nature. Because the membrane is so thin, physical properties, in particular the durometer of the material, are of secondary concern at most.

The physical properties are of significance in selecting the material for a presshead. To avoid crushing or breaking of thin ware, a soft, deformable material may be preferred for the presshead. By way of illustration, I have found that a preferred presshead material is a deformable silicone rubber with a durometer of about 30–40 on the Shore-00 scale. In contrast, I prefer a membrane material that has excellent release characteristics, but has a durometer of about 60–70.

A further feature of the invention is use of membrane and decal heating systems. In particular, the use of closely controllable heating systems permit determining and employing optimum temperature conditions for each stage of the operation. Thus, the decal is heated to a temperature where separation at the adhesive layer occurs most readily. Heating of the membrane means that it is at an optimum temperature for decal pickup. Also, heating of the presshead, while not so critical, does avoid it acting as a heat sink. The use of a thin membrane, controlled separately from the presshead, is significant with respect to temperature control. The membrane can be more quickly heated, or reheated, whereby the cycle is speeded up.

Within these basic considerations, numerous variations and modifications are contemplated. With the foregoing teaching as a guide, these will be readily evident to those conversant with the decal and decorating arts.

In particular, it is contemplated that a single presshead assembly might be used for all positions. It might be indexed in conjunction with the membrane table. The operation would, of course, be slower, but the apparatus would be simplified.

Also, as indicated earlier, position D is an optional operation. If cleaning and/or reheating of the membrane should prove unnecessary, this position might be omitted. A three-position table might then be used. However, the four-position table is preferred to speed up the cycle and increase the select rate of good ware.

I claim:

1. An apparatus for applying an offset, heat release decal to the surface of an article, the apparatus including

- a plurality of at least three separate work positions,
- a thin, deformable, silicone membrane carried by a support member,
- means for successively indexing the membrane and support member through the at least three work positions,
- means for heating the membrane at the first separate work position,
- means for presenting a decal for pickup by the heated membrane at the second separate work position,
- means, separate and distinct from the membrane, for applying pressure through the membrane, at the second work position, to deform the membrane against the decal,
- means for bringing the membrane and decal into close proximity to an article at the third separate work position and
- means, separate and distinct from the membrane, for applying pressure through the membrane to deform the membrane and to thereby print the decal on the surface of the article.

2. An apparatus in accordance with claim 1 wherein the silicone membrane is 0.040 to 0.100" (0.10–0.25 cm) thick.

3. An apparatus in accordance with claim 1 wherein the means for heating the membrane at the first position is a heated platen in close proximity to the membrane.

4. An apparatus in accordance with claim 1 wherein the means for heating the membrane at the first position includes infra-red heaters in close proximity to the membrane.

5. An apparatus in accordance with claim 1 wherein the means for presenting the decal for pickup is a vacuum device.

6. An apparatus in accordance with claim 1 further including means for heating the decal to a predetermined temperature at the second work position.

7. An apparatus in accordance with claim 1 wherein the means for applying pressure through the membrane, to press it into contact with the decal at the second work position, is a silicone presshead having a durometer value lower than that of the membrane and being separate and distinct from the membrane.

8. An apparatus in accordance with claim 1 further including a fourth work position having means for removing decal residue from the membrane.

9. An apparatus in accordance with claim 8 wherein said fourth work position further includes means for heating the membrane.

10. An apparatus in accordance with claim 1 which includes a single means for applying pressure against the silicone membrane, the single pressure-applying means being indexed in conjunction with the membrane and being separate and distinct from the membrane.

11. A method of applying an offset, heat release decal to an article surface which includes the steps of supporting a thin, deformable, silicone membrane at the membrane periphery, successively indexing the supported membrane through at least three separate work positions, heating the membrane to a predetermined temperature at the first separate work position, presenting a decal for pickup by the heated membrane at the second separate work position, heating the decal to a predetermined temperature, applying pressure through the membrane at the second work position by a member that is separate and distinct from the membrane, thereby deforming the membrane against the decal, releasing the pressure on the membrane thereby picking the decal up on the membrane, bringing the membrane, and the decal on the membrane, into close proximity with the article surface at the third separate work position, applying pressure through the membrane by a member that is separate and distinct from the membrane, thereby deforming the membrane to bring the decal on the membrane into contact with the article surface, and releasing the pressure on the membrane, thereby releasing the membrane from the decal and leaving the decal on the article surface.

12. A method in accordance with claim 11 wherein the decal presented at the second work position is attached to a backing by an adhesive layer and the decal is heated to a temperature such that the adhesive layer softens but does not flow.

13. A method in accordance with claim 11 wherein the membrane is deformed against the decal at the second work position by a silicone presshead having a durometer value lower than that of the membrane and being separate and distinct from the membrane.

14. A method in accordance with claim 11 wherein the membrane is deformed at the third work position, to force the decal into contact with the article surface, by a silicone presshead having a durometer value lower than that of the membrane and being separate and distinct from the membrane.

15. A method in accordance with claim 11 which includes a further step of cleaning decal residue from the silicone membrane at a fourth work position.

16. A method in accordance with claim 15 which includes preheating the silicone membrane.

* * * * *